US 6,532,510 B2

(12) United States Patent
Klein

(10) Patent No.: US 6,532,510 B2
(45) Date of Patent: *Mar. 11, 2003

(54) COMPUTER SYSTEM FOR PROCESSING SYSTEM MANAGEMENT INTERRUPT REQUESTS

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 149 days.

This patent is subject to a terminal disclaimer.

(21) Appl. No.: 09/825,657

(22) Filed: Apr. 3, 2001

(65) Prior Publication Data

US 2001/0016892 A1 Aug. 23, 2001

Related U.S. Application Data

(63) Continuation of application No. 09/156,182, filed on Sep. 17, 1998, now Pat. No. 6,212,592.

(51) Int. Cl.[7] .............................................. G06F 13/24
(52) U.S. Cl. ..................... 710/260; 710/40; 710/41; 710/200; 710/220; 710/240; 710/244; 711/147; 711/151; 711/152; 711/158
(58) Field of Search ........................... 710/40, 41, 200, 710/220, 240, 244, 260–269; 711/147, 151, 152, 158

(56) References Cited

U.S. PATENT DOCUMENTS

| | | | |
|---|---|---|---|
| 4,438,489 A | * 3/1984 | Heinrich et al. ............. 710/264 |
| 5,175,853 A | 12/1992 | Kardach et al. ............. 395/650 |
| 5,317,745 A | * 5/1994 | Chan ........................... 710/264 |
| 5,339,437 A | 8/1994 | Yuen ........................... 395/700 |
| 5,392,420 A | 2/1995 | Balmer et al. ............... 395/500 |
| 5,475,829 A | 12/1995 | Thome ......................... 395/479 |
| 5,509,139 A | 4/1996 | Ayash et al. ................. 395/869 |
| 5,511,204 A | 4/1996 | Crumpt et al. ............... 395/750 |
| 5,530,891 A | 6/1996 | Gephardt ...................... 395/800 |
| 5,539,901 A | 7/1996 | Ramirez ....................... 395/500 |
| 5,544,344 A | 8/1996 | Frame .......................... 395/471 |
| 5,551,044 A | 8/1996 | Shah et al. .................. 395/750 |
| 5,555,430 A | 9/1996 | Gephardt et al. ........... 395/800 |
| 5,561,060 A | 10/1996 | Wink et al. .................. 435/124 |
| 5,564,060 A | 10/1996 | Mahalingaiah et al. ..... 395/871 |
| 5,568,649 A | 10/1996 | MacDonald et al. ........ 395/868 |
| 5,590,312 A | 12/1996 | Marisetty .................... 395/500 |
| 5,590,315 A | 12/1996 | Hess et al. .................. 395/500 |
| 5,867,687 A | * 2/1999 | Simpson ...................... 710/264 |
| 5,937,200 A | * 8/1999 | Frid et al. .................... 710/264 |
| 5,968,159 A | * 10/1999 | Mattheis ...................... 710/264 |
| 6,061,757 A | * 5/2000 | Arimilli et al. ............. 710/264 |
| 6,065,088 A | * 5/2000 | Bronson et al. ............ 710/263 |

* cited by examiner

Primary Examiner—Rupal Dharia
(74) Attorney, Agent, or Firm—Dorsey & Whitney LLP

(57) ABSTRACT

A computer system processes system management interrupt (SMI) requests from plural system management (SM) requesters. Different SM requesters are provided with different priority levels such that high priority system management interrupts can be serviced without waiting for lower priority system management interrupts to be serviced completely. In particular, the system executes a first SMI handler routine in response to receiving a first SMI from a first SM requester. In response to receiving a second SMI asserted by a second SM requester, the system determines whether the second SMI request has been assigned a higher priority than the first SMI request. If so, then the system interrupts executing the first SMI handler routine and executes a second SMI handler routine corresponding to the second SMI request. Otherwise, the system completes executing the first SMI handler routine and then executes the second SMI handler routine.

18 Claims, 3 Drawing Sheets

COMPUTER SYSTEM FOR PROCESSING SYSTEM MANAGEMENT INTERRUPT REQUESTS

CROSS-REFERENCE TO RELATED APPLICATION

This application is a continuation of U.S. patent application Ser. No. 09/156,182, filed Sep. 17, 1998 now U.S. Pat. No. 6,212,592.

TECHNICAL FIELD

The present invention relates to computer systems, and more particularly, to computer systems for processing system management interrupts.

BACKGROUND OF THE INVENTION

Most modern computer systems, such as those based on the Intel® Pentium® processor, are equipped with a special processing mode known as system management mode. In system management mode, the computer processor executes software instructions accessed from a completely separate address space than the normal address space in which the system memory is mapped. That is, the physical system memory is mapped according to a normal address mapping when the processor is not in system management mode and is mapped according to a system management mode address mapping when the processor is in system management mode.

"System management mode is commonly used when implementing control features such as power management. A common implementation of power management is to turn off power to a device when it has been idle for a programmed amount of time. When the device is accessed again, power is reapplied and the input/output (I/O) instruction that caused the access is executed."

A typical prior art computer system that implements system management mode includes a processor coupled by a processor bus to a North bridge that includes a memory controller coupled to a system memory. The North bridge typically is coupled by a primary computer bus to a South bridge which is coupled by a secondary computer bus to various computer devices, such as a keyboard. The South bridge typically is coupled directly to a System Management Interrupt (SMI) pin of the processor to enable the South bridge to submit an SMI request by driving the SMI pin.

Suppose the keyboard is inactive for an extended amount of time. Many current South bridges will detect that the keyboard is not being used and will submit an SMI request to the processor. In response, the processor saves state information stored in internal registers to a predetermined portion of system management memory and jumps to an entry point in system management memory where an SMI handler routine is located. The processor executes the SMI handler routine to service the power management request by saving the state of the inactive device to system management memory and powering-down the device. Upon completing its task as specified by the SMI handler routine, the processor retrieves and restores the saved processor state from system management memory, exits system management mode, and continues normal program execution. The processor exits system management mode and returns to normal mode in response to a return to system management mode (RSM) instruction at the end of the SMI handler routine.

A problem with prior art implementations of system management mode is that SMI requests can only be processed serially. After an SMI request is recognized, the SMI pin is masked by the processor until the SMI handler finishes processing the SMI request. If another SMI request is asserted while a current SMI request is being serviced, the second SMI request is latched and can only be serviced after the SMI handler completes servicing the first SMI request. If a third SMI request was attempted while the first SMI request was being serviced, the third SMI request would be lost. Such serial processing of SMI requests prevents prior art computer systems from implementing time-sensitive applications using system management mode.

An additional problem of prior art systems is that the SMM memory space is limited to 64 KB of memory. Given that some of the SMM memory space is needed to store the state of the CPU and devices of the computer, there is somewhat less than 64 KB for the SMI handler routine. As a result, the services that can be provided by prior art SMI handler routines are limited to those that are necessary and that can be provided by programming that fits within the limited SMM memory space.

SUMMARY OF THE INVENTION

The invention is directed to a computer system for processing system management interrupt (SMI) requests. The computer system includes first and second system management (SM) requesters each structured to assert SMI requests. A processor coupled to the first and second SM requesters is structured to activate a system management mode in response to receiving an SMI request from one of the SM requesters. A memory controller coupled to the processor and a system memory is structured to access a first SMI handler routine in the system memory if the processor activates system management mode in response to receiving an SMI request from the first SM requester. The memory controller is structured to access a second SMI handler routine in the system memory if the processor activates system management mode in response to receiving an SMI request from the second SM requester. Employing separate SMI handlers enables different SM requesters to instigate system management mode for different purposes. In one embodiment, the method enables three SMI handler routines to be employed.

In another aspect of the invention, different SM requesters can be provided with different priority levels such that high priority SMI requests can be serviced without waiting for lower priority system management interrupts to be serviced completely. In particular, the processor executes a first SMI handler routine in response to receiving a first SMI request from a first SM requester. In response to the processor receiving a second SMI request asserted by a second SM requester, the memory controller determines whether the second SMI request has been assigned a higher priority than the first SMI request. If so, then the memory controller causes the processor to interrupt executing the first SMI handler routine and execute a second SMI handler routine. Otherwise, the memory controller allows the processor to complete executing the first SMI handler routine and then execute the second SMI handler routine.

DETAILED DESCRIPTION OF THE INVENTION

Figure 1:
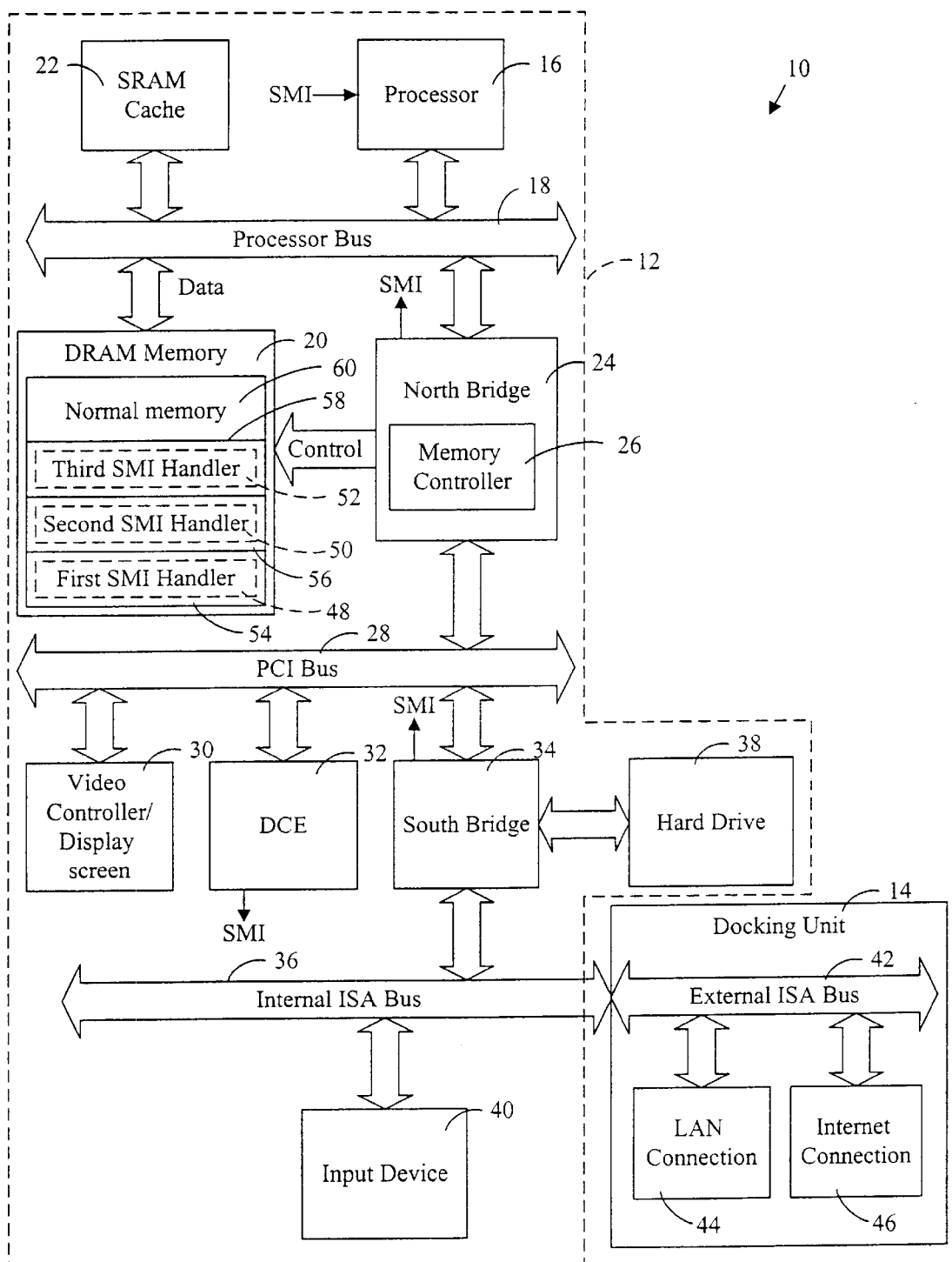
FIG. 1 is a block diagram of a computer system employing plural system management interrupt handler routines according to the present invention.

A computer system 10 that implements a method of providing a system management mode (SMM) according to an embodiment of the present invention is shown in FIG. 1. The computer system 10 includes a portable computing unit 12 releasably coupled to a docking unit 14. The portable computing unit 12 includes a processor 16 coupled by a processor bus 18 to a system memory 20 and a cache unit 22. The processor 16 can include any microprocessor that includes a system management mode, such as the Pentium® or Pentium® Pro microprocessors from Intel Corp. or various microprocessors from other manufacturers. As is typical, the system memory unit 20 is comprised of dynamic random access memory (DRAM) and stores software instructions and data that are used by the processor 16 to perform a specified function. The software instructions include application programs and an operating system, such as Microsoft Windows® 95, that interfaces the application programs with the hardware of the computer system 10. The cache unit 22 may include static random access memory (SRAM) that stores frequently accessed instructions and data that can be accessed by the processor 16 more quickly than the instructions and data stored in the system memory 20.

Coupled to the processor bus 18 and the system memory 20 is a North bridge 24. The North bridge 24 includes a memory controller 26 that controls how information is read from and written to the system memory 20. Although the memory controller 26 controls the system memory 20, the data read from or written to the system memory 20 passes directly between the processor 16 and system memory 20 via a data bus portion of the processor bus 18. In addition, the North bridge 24 interfaces a Peripheral Component Interconnect (PCI) bus 28 to the processor bus 18.

Coupled to the PCI bus 28 are a video controller/display screen unit 30, a data communications equipment (DCE) device 32, and a South bridge 34. The DCE device 32 is coupled or coupleable to a connection line (not shown), such as a cable or a telephone line that enables the portable computing unit 12 to communicate with another computer. As discussed in more detail below, the DCE device 32 cooperates with the processor 16 to provide a soft modem in one embodiment of the invention.

The South bridge 34 interfaces an internal Industry Standard Architecture (ISA) bus 36 to the PCI bus 28. The South bridge 34 also is coupled to a non-volatile memory device 38, such as a hard disk drive or a CD-ROM drive. Coupled to the internal ISA bus 36 are an input device 40, such as a keyboard or mouse, and an external ISA bus 42 of the docking unit 14. Coupled to the external ISA bus 42 are a local area network (LAN) connection 44 and a dedicated internet connection 46. In addition to the LAN connection 44 and the internet connection 46, numerous other computer components, such as a full size keyboard and a large video monitor, could be coupled to the external ISA bus 42 as desired.

The system memory 20 is mapped according to two separate address spaces: an SMM address space and a normal, non-SMM address space. When the computer system 10 is in system management mode, the SMM address space is used to address the system memory 20 and when not in system management mode, the normal address space is used to address the system memory 20. In addition, the normal address space is typically much larger than the actual physical space than the system memory 20, so much of the normal address space typically will be physically stored outside of the system memory 20 such as in the hard drive 38. As such, memory blocks of the SMM and normal address space are loaded into the physical system memory 20 as needed.

In contrast to prior art computer systems, the computer system 10 includes first, second, and third system management interrupt (SMI) handler routines 48, 50, 52 stored in the system memory 20. The first, second, and third SMI handler routines 48–52 are stored in first, second, and third memory blocks 54, 56, 58, respectively, of the system memory 20. The size of each of the memory blocks 54–58 may vary depending on the size of the respective SMI handler routines and the use of the term "memory block" is not intended to be limited to any size in which DRAM memories are commonly divided. Further, each of the SMI handler routines 48–52 may be separately loadable into the system memory 20 or could be loaded as part of a single memory block from read only memory (ROM) modules or the hard drive 38 by the processor 16 during system initialization. Typically, the SMI handler routines 48–52 will occupy a relatively small portion of the system memory 20, thereby leaving a relatively large normal memory block 60 that may be used during system management mode and during normal, non-system management mode.

Employing three separate SMI handler routines 48–52 enables the computer system 10 to prioritize different SMI requests depending on which device instigated the request. In one embodiment, the first SMI handler 48 is designed to respond to an SMI request for powering down an idle device or powering up the device as desired. For example, if the input device 40 is idle for a predetermined time, a system management (SM) requester, such as the North bridge 24 or the South bridge 34, could submit an SMI request to the processor 16 requesting that the input device 40 be powered down. Such an SMI request can be assigned a low priority because it is not necessary for an idle device to be powered down immediately.

The second SMI handler routine 50 can be programmed to respond to SMI requests to emulate a non-existent device that is requested by one of the other devices. For example, when the portable computing unit 12 is detached from the docking unit 14 and the processor 16 requests access to one of the devices that remain attached to the docking unit, such as the LAN connection 44, the South bridge 34 may submit an SMI request to the processor 16. In response, the second SMI handler routine 50 can emulate the missing device by performing the function requested of the device or informing the application program that caused the missing device to be requested that the device is unavailable until further notice. Such an emulation function typically requires more immediate service than powering down an idle device, and thus, the SMI request associated with the second SMI handler routine 50 can be assigned a higher priority than the SMI request associated with the first SMI handler routine 48. As discussed in more detail below with respect to FIGS. 2 and 3, assigning the SMI request a higher priority means that the servicing of the lower priority SMI request will be interrupted in order to service the higher priority SMI request. After serving the higher priority SMI request, then the servicing of the lower priority SMI request can be continued.

The third SMI handler routine 52 enables the processor 16 and DCE device 32 to implement a soft modem. A soft modem is a modem that is implemented using the computer processor 16 to ensure that the soft modem stays connected, receives data, and transmits data as needed via the DCE device 32. This contrasts with typical hardware modems that include a separate digital signal processor (DSP) that controls the connection and the receipt and transmission of data. Prior art computer systems do not enable real time implementation of a soft modem because such a soft modem would have to monopolize the computer system processor in order to ensure that the soft modem stays connected to the telephone line being used. If the computer system processor were not monopolized, such as by asserting an SMI request only when the computer system processor was needed, then there would be no assurance that the services of the processor would be available when needed. For example, if the prior art computer system were already in system management mode in order to power down an idle device, a new SMI request needed to transmit data in order to keep the soft modem connected would have to wait until the servicing of the first SMI request were completed. Such a wait could easily be too long to enable the soft modem to remain connected.

Given the time-critical needs of such a soft modem, the SMI requests for use of the third SMI handler 52 can be assigned a priority that is higher than the priority for either of the first and second SMI handlers 48, 50. As such, if either of the first and second SMI handler routines 48, 50 is currently operating to service a first SMI request, the execution of the SMI handler routine can be interrupted in order to allow the third SMI handler routine 52 to service the high priority SMI request. That is, if the DCE device 32 receives a data request from the other computer to which the computer system 10 is connected, the DCE device 32 will assert an SMI request that will be recognized as being a high priority SMI request, and in response, the processor 16 interrupts the operation of the current SMI handler routine and executes the instructions of the third SMI handler routine 52.

Figure 2:
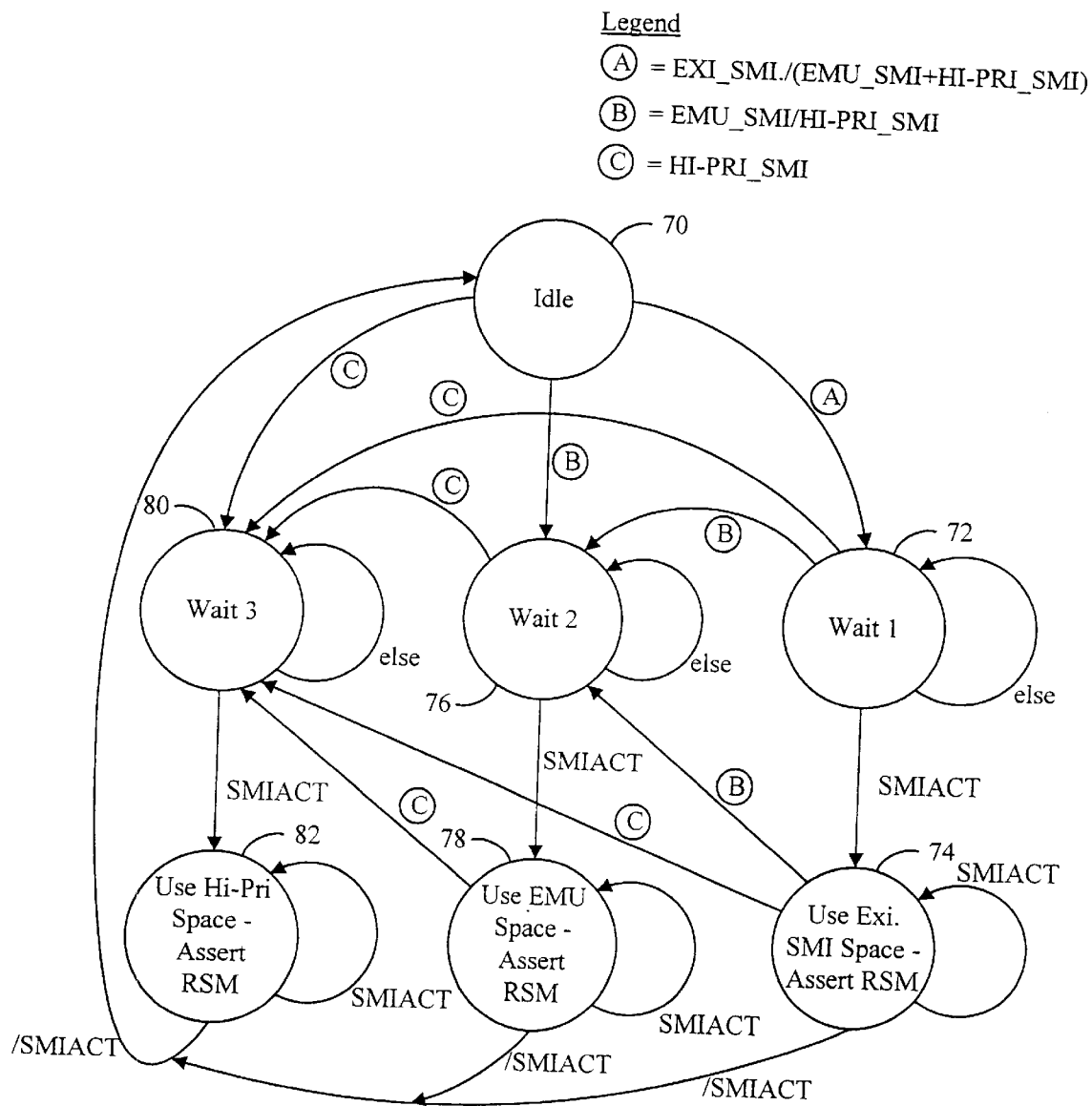
FIG. 2 is a state diagram illustrating one embodiment of how system management interrupts are serviced according to the present invention.

A state diagram of one method of implementing a prioritized system management mode according to one embodiment of the present invention is shown in FIG. 2. It should be appreciated that according to the legend shown on FIG. 2, the "EXI_SMI" indicates a low priority SMI request ("EXI" refers to a type of SMI request that typically occurs with previously existing computer systems). The "EMU_SMI" refers to a medium priority SMI request to emulate a disconnected or otherwise unavailable device and the HI-PRI_SMI refers to a highest priority SMI request for a time-critical service such as a soft modem. The "/" at the beginning of a signal name indicates that the signal is de-asserted. As such, the encircled "A" in the legend means that the EXI_SMI type of SMI request (such as a power management request) is asserted while the EMU_SMI and the HI-PRI_SMI requests are de-asserted. Similarly, the encircled "B" means that the EMU_SMI request is asserted while the HI-PRI_SMI request is de-asserted. The encircled "C" means that the high priority SMI request (HI-PRI_SMI) is asserted.

During normal operation of the computer system 10, the system management mode is in an idle state 70. In the idle state 70, the SMI handler routines 48–52 typically would be stored in the system memory 20. If an SMI request is asserted in order to power down an inactive device (as represented by the encircled "A" path), then the North bridge 24 goes to a first wait state 72 waiting for the processor 16 to enter system management mode. The processor 16 responds to the low priority SMI request by asserting an SMI active signal (SMIACT) to notify the memory controller 26 that the processor is entering system management mode in a first "use" state 74.

In the first use state 74, the processor 16 saves to the system memory 20 (as addressed by the SMM address space) the current state or context of the processor, that is, the contents of internal registers of the processor. In response to receiving the SMIACT signal, the memory controller 26 ignores the upper address bits and fetches instructions and data from the SMI handler routine 48, which is stored in first memory block 54 of the system memory 20, as directed by the processor 16. The first SMI handler routine 48 first checks status registers to determine the nature of the SMI request (e.g., which device(s) should be powered down or up). Once the request is identified, the particular software instructions of the SMI handler routine 48 that are designed to handle the SMI request are executed by the processor 16. The last instruction of the first SMI handler routine 48 is a return from system management mode (RSM) instruction, which causes the processor 16 to de-assert the SMIACT signal (/SMIACT) and return to normal program flow, which returns the system management mode to the idle state 70.

If the computer system 10 is in any of the first three system management mode states 70–74 when a medium priority SMI request (EMU_SMI) is asserted, then the method goes to a second wait state 76 along one of the paths indicated by the encircled "B." When the processor 16 responds to the medium priority SMI request by asserting the SMIACT signal, the method moves to a second "use" state 78. In the second use state 78, the processor saves the context of its internal registers. If the computer system 10 is entering SMM from the idle state 70, then the context saved represents the context of the processor 16 in normal mode. If the computer system 10 was already in SMM in response to a low priority SMI request, then the context saved is the context of the processor 16 during execution of the first SMI handler routine 48. Saving such context enables the processor 16 to continue executing the first SMI handler routine after completing executing the second SMI handler routine 50. In addition, the memory controller 26 fetches instructions and data from the second SMI handler routine 50, which is stored in the second memory Block 56, and the processor executes the instructions of the second SMI handler routine. The last instruction of the second SMI handler routine 50 is an RSM instruction, which causes the processor 16 to de-assert the SMIACT signal and return the system management mode to the idle state 70.

"If the computer system 10 is in any of the system management mode states 70–78 when a high priority SMI request (HI-PRI_SMI) is asserted, the computer system goes into a third wait state 80 along any of the paths indicated by the encircled "C." When the processor asserts the SMIACT signal in response to the high priority SMI request, then the computer system 10 enters a third SMM "use" state 82. In the third use state 82 the processor 16 saves the context information in its internal registers and the memory controller 26 fetches instructions and data of the third SMI handler routine 52 from the third SMI memory block 58 of the system memory 20. Saving the context of the processor 16 enables the processors to finish executing the other SMI handler routines 48–50 if they were interrupted and return to executing its normal application program after completing SMM. The processor 16 services the high priority SMI request by executing the instructions of the third SMI handler routine 52. Once again, the last instruction of the third SMI handler routine 52 is an RSM instruction which causes the processor 16 to de-assert the SMIACT signal (/SMIACT) which returns the computer system 10 to the idle state 70 of system management mode."

Figure 3:
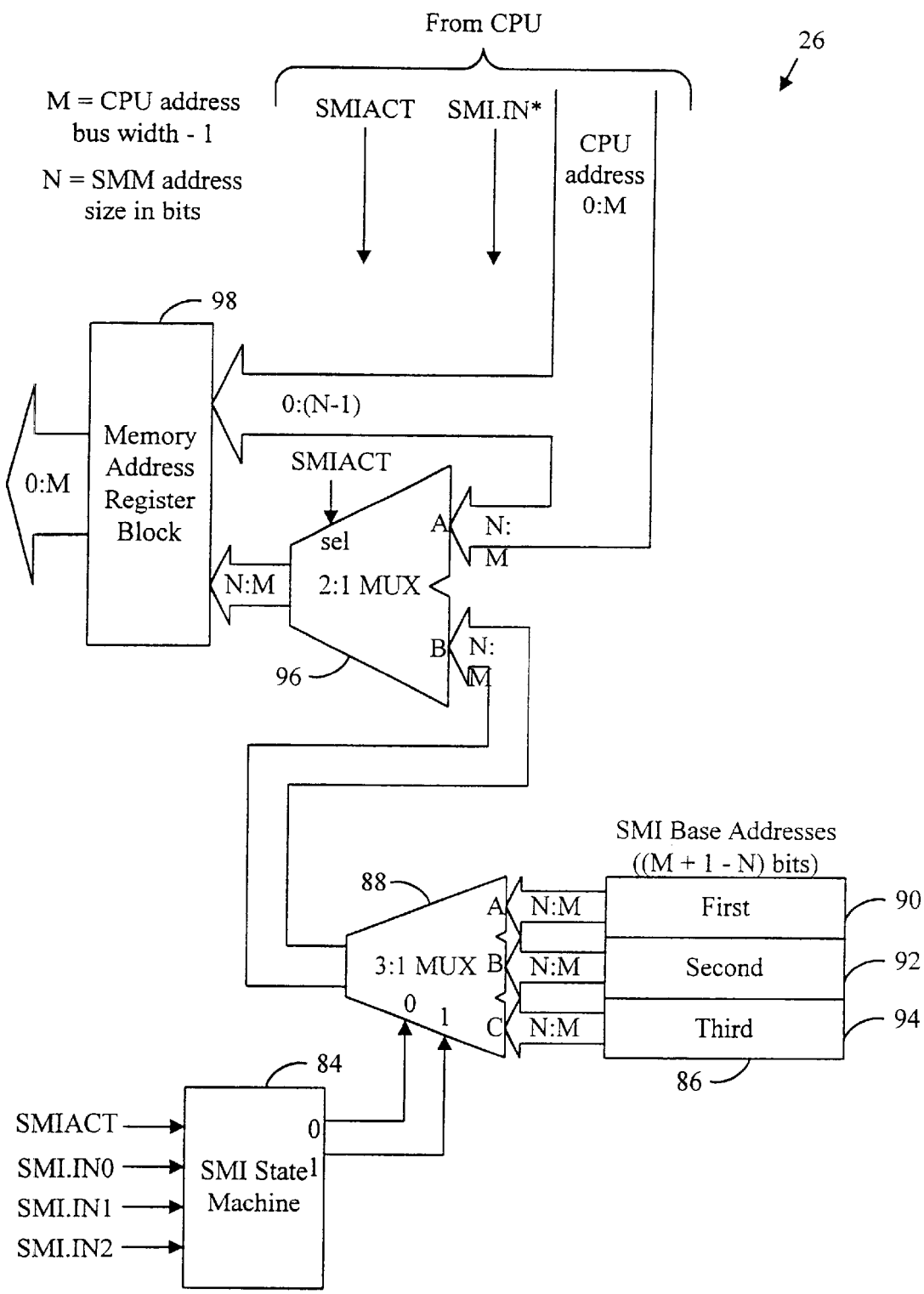
FIG. 3 is a schematic block diagram of a bridge that executes system management interrupts according to an embodiment of the present invention.

A block diagram of the operation of the memory controller 26 for system management mode is shown in FIG. 3. The memory controller 26 includes an SMI state machine 84 that receives as inputs the SMIACT signal and one or more of three status register signals (SMI.IN*) from the processor 16. The SMI.IN0 status signal indicates that a low priority SMI request was received, the SMI.IN1 status signal indicates that a medium priority SMI request was received, and the SMI.IN2 status signal indicates that a high priority SMI request was received by the processor 16. In response to receiving the SMIACT signal and one or more of the SMI.IN* status signals, the SMI state machine 84 outputs a two-bit output code that indicates the highest priority SMI.IN* status signal that was received. For example, an output code of 00 may correspond to the low priority status signal, 01 may correspond to the medium priority status signal, and 10 may correspond to the high priority status signal.

The memory controller 26 also includes an SMI base address register file 86 coupled to a 3 by 1 multiplexer 88. The SMI base address register file 86 includes a first register 90 that stores an SMI base address for the first SMI handler routine 48, a second register 92 that stores an SMI base address for the second SMI handler routine 50, and a third register 94 that stores an SMI base address for the third SMI handler routine 52. The SMI base addresses are addresses within the system management address space that is used by the memory controller 26 to address the system memory 20 when in system management mode. As such, each of the SMI base address points to the physical memory block to which its repective SMI handler routine is loaded during system initialization.

The multiplexer 88 has first, second, and third inputs a, b, and c coupled to the first, second, and third registers 90–94, respectively. In response to receiving an output code from the SMI state machine 84, the multiplexer 88 outputs from the SMI base address register file 86 whichever one of the SMI base addresses corresponds to the output code received from the SMI state machine 84. For example, assuming the output code 10 corresponds to the high priority SMI request, then the multiplexer 88 outputs from the third register 94 the SMI base address of the third SMI handler 52.

Coupled to the 3 by 1 multiplexer 88 is a 2 by 1 multiplexer 96. The 2 by 1 multiplexer 96 has a first input "a" coupled to the address bus portion of the processor bus 18 and a second input "b" coupled to the output of the 3 by 1 multiplexer 88. The output of the multiplexer 96 is coupled to a memory address register block 98 that stores addresses that are loaded into the system memory 20. The multiplexer 96 includes a select input (SEL) coupled to the SMIACT signal to control which of the inputs "a, b" are connected to the output of the multiplexer 96. If the SMIACT signal is asserted, then the second input "b," which is coupled to the output of the 3 by 1 multiplexer 88, is output and if the SMIACT signal is de-asserted, then the address portion at the first input "a" is output. What that means is when the computer system 10 is in system management mode as indicated by the asserted SMIACT signal, the address loaded into the memory address register block 98 includes address bits 0 to N-1 of the address received from the processor 16 and address bits N-M received from the SMI base address register file 86 via the multiplexer 88. As such, the address bits N-M point to the beginning of the SMI handler routine and the address bits 0 to N-1 act as an offset within the SMI handler routine. When the computer system 10 is not in system management mode (the SMIACT signal is inactive), then bits N-M of the address from the processor 16 are output by the multiplexer 96 so that the memory address register block 98 gets all bits 0-M from the processor 16 if the system memory 20 is being accessed. The memory controller 26 loads into the system memory 20 whichever address is loaded into the memory address block 98.

It should be appreciated that the embodiment illustrated in FIGS. 1–3 is exemplary only. More or fewer than three different SMI handlers can be employed depending on the needs of the computer system. Moreover, there are other numerous types of functions that can be implemented using the system management mode as discussed herein in addition to the power management, regulation, and soft modem functions discussed above.

Based on the foregoing discussion, it will be appreciated that high priority system management mode requesters can interrupt the servicing of lower priority SMI requests in order to enable the higher priority SMI request to be processed without unnecessary delay. As such, the method enables time-critical functions, such as those of a soft modem, to be implemented. This contrasts with prior art system management mode methods that could cause such long delays in processing SMI requests that time-critical applications like a soft modem could not be implemented.

An additional advantage of employing plural SMI handler routines is that it enables SMM memory to occupy more than 64 KB of the system memory 20. Each SMI handler routine has a separate entry point or SMI base address that is not limited to a single 64 KB memory block. Accordingly, the invention allows SMM to be used to provide many more services that could be provided by prior art SMM systems.

It should be understood that even though numerous advantages of the present invention have been set forth in the foregoing description, the above disclosure is illustrative only. Changes may be made in detail and yet remain within the broad principles of the present invention.

What is claimed is:

1. A computer system for processing system management interrupt (SMI) requests, comprising:
    a plurality of system management (SM) requesters adapted to assert SMI requestes;
    a processor coupled to the plurality of SM requesters, the processor being adapted to activate a system management mode in response to receiving an SMI request from at least one of the SM requesters;
    a system memory; and
    a memory controller coupled to the processor and the system memory, the memory controller including a selector component adapted to receive a mode indicator signal from the processor, the memory controller being adapted to access a first one of a plurality of SMI handler routines in the system memory in response to a first value of the mode indicator signal, the memory controller including
        a plurality of base address registers, each base address register storing an SMI base address corresponding to a respective one of the SMI handler routines;
        a memory address register block that stores an address of information that is accessed from the system memory;
        first and second multiplexers, the first multiplexer having a first input coupled to one of the plurality of SMI base address registers, a second input coupled to another of the SMI base address registers, and an output coupled to a first input of the second multiplexer, the second multiplexer having a second input coupled to the processor, and an output coupled to the memory address register block; and an SMI state machine coupled to the processor, the first multiplexer, and the plurality of SMI base address registers, the SMI state machine causing the first multiplexer to transmit at least one of the SMI base addresses to the second multiplexer in response to receiving from the processor the mode indicator signal having the first value, the SMI state machine further causing the second multiplexer to load into the memory address register block whichever SMI base address is output by the first multiplexer when the mode indicator signal has the first value and allowing the second multiplexer to load into the memory address register block an address from the processor when the mode indicator signal does not have the first value.

2. The computer system of claim 1 wherein the plurality of base address registers includes:

a first SMI base address register that stores a first SMI base address corresponding to the first SMI handler routine; and a second SMI base address register that stores a second SMI base address corresponding to a second SMI handler routine.

3. The computer system of claim 1 wherein the SMI state machine being adapted to retrieve a first SMI base address from a first SMI base address register in response to receiving from the processor an indication that the processor received an SMI request from a first SMI requester and being adapted to retreive a second SMI base address from a second SMI base address register in response to receiving from the processor an indication that the processor received an SMI request from a second SMI requester.

4. The computer system of claim 1 wherein the SMI state machine being adapted to receive an indication from the processor indicating that the processor has received an SMI request from the second SM requester while the processor is executing the first SMI handler routine and in response to receiving the indication, determines that the second SM requester has a higher priority than the first SM requester, retrieves the second SMI base address from the second SMI base address register, and interrupts the executing of the first SMI handler routine by loading the second SMI handler routine into the system memory using the second SMI base address.

5. The computer system of claim 1 wherein the SMI state machine being adapted to cause the first multiplexer to load a first SMI base address into the memory address register block in response to receiving from the processor an indication that the processor received an SMI request from a first SMI requester and being adapted to cause the first multiplexer to load a second SMI base address into the memory address register block in response to receiving from the processor an indication that the processor received an SMI request from a second SMI requester.

6. The computer system of claim 1 wherein the plurality of base address registers includes:

a first SMI base address register that stores a first SMI base address corresponding to a first SMI handler routine;

a second SMI base address register that stores a second SMI base address corresponding to a second SMI handler routine; and a third SMI base address register that stores a third SMI base address corresponding to a third SMI handler routine.

7. The computer system of claim 1 wherein at least one of the SM requesters includes a data communications equipment (DCE) device adapted to communicate with another computer system, and wherein at least one of the SMI handler routines includes computer instructions for causing the processor to implement a soft modem in conjunction with the DCE device.

8. A computer system for processing system management interrupt (SMI) requests, comprising:

a plurality of SM requesters, each requester being capable of asserting a system management interrupt (SMI) request;

executing means for executing a first SMI handler routine in response to receiving a first SMI request; and control means for interrupting execution of the first SMI handler routine in response to receiving a second SMI request, wherein the executing means includes means for executing a second SMI handler routine in response to receiving a second SMI request, the control means including a selector component adapted to receive a mode indicator signal from the executing means, and a context address from the executing means, and outputs either an SMI base address when the mode indicator signal indicates the executing means is in a system management mode or the context address when the mode indicator signal indicates the executing means is not in the system management mode.

9. The computer system of claim 8 wherein the executing means includes means for returning to executing the first SMI handler routine after completing executing the second SMI handler routine.

10. The computer system of claim 8 wherein the executing means includes:

a system memory that stores the first and second SMI handler routines;

a processor that activates system management mode in response to receiving one of the SMI requests and executes instructions of the first and second SMI handler routines; and a memory controller that accesses from the system memory whichever SMI handler routine corresponds to the SMI request that causes the processor to activate system management mode.

11. The computer system of claim 8 wherein at least one of the executing means and the control means is adapted to activate a system management mode in response to the first SMI request;

is adapted to retrieve a first SMI address for the first SMI handler routine, the first SMI address pointing to a first memory block; and is adapted to access the first SMI handler routine from the first memory block using the first SMI address.

12. The computer system of claim 8 wherein the first and second SMI requests have priority levels and the executing means includes means for, in response to receiving the second SMI request, determining that the second SMI request has a higher priority level than that of the first SMI request and executing the second SMI handler routine in response thereto.

13. The computer system of claim 8 wherein at least one of the SM requesters includes a data communications equipement (DCE) device adapted to communicate with another computer system, wherein a second SMI handler routine includes computer instructions for causing the executing means to implement a soft modem in conjunction with the DCE device.

14. A memory controller for a computer system for processing system management interrup (SMI) requests, the computer system including a system memory, processor, and plural system management (SM) requesters, the memory controller comprising:

a plurality of SMI base address registers that store a plurality of SMI base addresses corresponding to a plurality of SMI handler routines;

an SMI state machine coupled to the plurality of SMI base address registers, the SMI state machine being adapted to retreive a respective one of the SMI base addresses from a respective one of the SMI base address registers; and a selector component operatively coupled to the SMI state machine and the processor, the selector component receiving the respective one of the base addresses from the SMI state machine and a mode indicator signal from the processor, and a context address from the processor, and outputting the respective one of the SMI base addresses when the mode indicator signal indicates the processor is in a system management mode, or outputting the context address when the mode indicator signal indicates the processor is not in the system management mode.

15. The memory controller of claim 14 wherein the state machine is adapted to access from the system memory a respective one of the SMI handler routines using the respective one of the SMI base addresses.

16. The memory controller of claim 14, further comprising a memory address register block that stores an address of information output by the selector component to be accessed from the system memory.

17. The computer system of claim 14 wherein the selector component comprises a first multiplexer and the SMI state machine comprises a second multiplexer, the first multiplexer having an output coupled to the memory address register block, a first input coupled to an address bus coupled to the processor, and a second input coupled to the output of the second multiplexer, the SMI state machine being adapted to cause the first multiplexer to load into the memory address register block the respective one of the SMI base addresses output by the second multiplexer when the memory controller is in a system management mode and allowing the first multiplexer to load into the memory address register block an address from the address bus when the memory controller is not in system management mode.

18. The memory controller of claim 14 wherein the SMI request comprises a first SMI request and wherein the SMI state machine is adapted to receive an indication from the processor indicating that the processor has received a second SMI request from a second one of the SM requesters while the processor is executing an SMI handler routine corresponding to the first SMI request, and in response to receiving the indication, determines that the second SMI request has a higher priority than the first SMI request, retrieves a second respective one of the SMI base addresses from the plurality of SMI base address registers, and interrupts the executing of the SMI handler routine corresponding to the first SMI request by accessing the SMI handler routine corresponding to the second SMI request from the system memory using the second respective one of the SMI base addresses.

* * * * *